3,497,781
CIRCUITRY FOR BRUSHLESS DIRECT CURRENT MOTOR
J. Roger Toth, Northfield, and Michael L. Gilliland, Kent, Ohio, assignors to Ametek, Inc., a corporation of Delaware
Filed July 14, 1967, Ser. No. 653,466
Int. Cl. H02k 21/00; H02p 7/00
U.S. Cl. 318—138                                   10 Claims

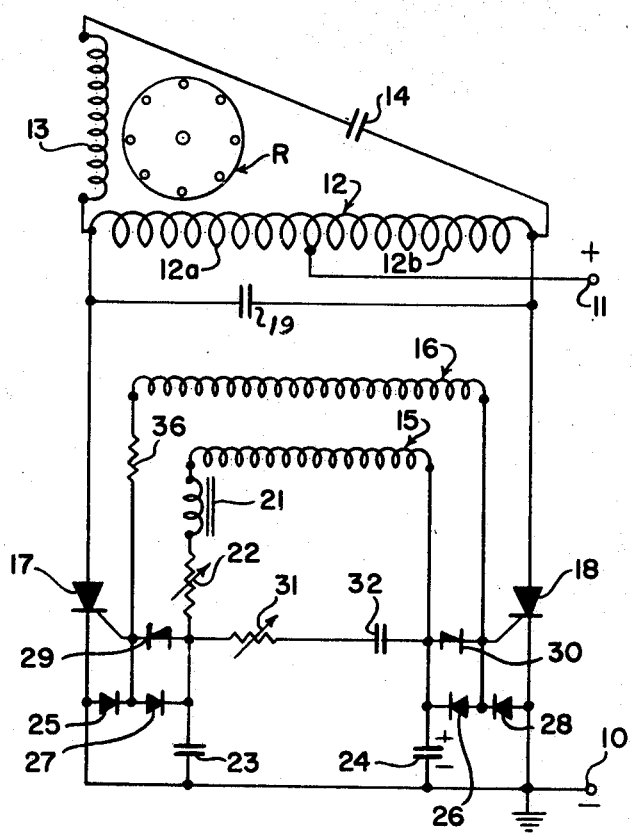
INVENTORS.
J. ROGER TOTH &
MICHAEL L. GILLILAND
BY
*Ely & Golrick*
ATTORNEYS United States Patent Office 3,497,781
Patented Feb. 24, 1970

ABSTRACT OF THE DISCLOSURE

A motor with alternating current or induction motor type mechanical electromagnetic structure with center-tapped main field winding incorporated in a parallel capacitor inverter or oscillator circuit, having silicon controlled rectifiers with anodes connected to the ends of the main winding and commonly connected cathodes as electronic switching devices periodically switching direct current application to the field winding to develop an alternating magnetic field; a main feedback winding and an auxiliary feedback winding on the field structure inductively coupled with the field winding; the main feedback winding, an inductor and a resistor in a series connected at each end (a) by a uni-directional PNP trigger switch to the gate of, (b) by a series pair of diodes and a timing capacitor in parallel with the diode pair to the cathode of, a respective SCR, forming a main feedback LRC timing branch for alternately gating the SCR's with well-shaped pulses, by capacitor discharge solely through a trigger device and the gate-cathode of the respective SCR to give a fast gate pulse rise; the auxiliary feedback winding with a resistor in a series connected at each end to a respective SCR gate and by one of the diodes of the corresponding diode pair to the respective SCR cathode, as an auxiliary feedback branch alternately applying a continuing signal to each gate to keep the respective SCR turned on through or despite a period of back biasing under the inductive load conditions; also a capacitor and adjustable resistor in series between the two ends of the feedback winding-inductor-resistor series, or between one end thereof and the commonly connected SCR cathodes, for adjusting inverter frequency and thereby motor speed; the circuitry here disclosed in a single phase wound motor with starting winding and phase shifting capacitor across the main winding.

———

The present invention relates to improved feedback circuitry for an inverter or oscillator circuit in a motor energized by direct current but operating as an alternating current motor.

In the copending Toth application Ser. No. 559,646, now U.S. Patent No. 3,416,055, there is disclosed a brushless motor of the type here described wherein a main feedback circuit charges a capacitor to successive alternate polarities to gate respective SCR's of the inverter motor circuitry with well-shaped pulses arising upon discharge at the trigger voltage of a solid state bi-directional trigger switch; wherein also there is provided an auxiliary feedback winding in a "keep-alive" branch maintaining a gate signal on each SCR whereby the SCR is kept on for a half cycle of inverter operatoin despite back biasing arising, due to the inductive load, after the initial main feedback gating pulse has occurred. In that pending case applications of features of the feedback and firing circuitry to transistorized oscillator circuitry, and to polyphase wound motor types are also disclosed, which mutatis mutandis are here pertinent. However, it has now been found that the prior art circuitry may be further improved by the circuitry here presented, wherein the gating pulses derived by discharge of a capacitor in the main feedback circuit through a solid state trigger switch are achieved by a discharge over a path including only the trigger switch and the anode-cathode pair of the respective SCR, eliminating the impedance of other diodes in the discharge path.

A consequent advantage is that a wider choice of silicon controlled rectifiers is made possible because of the still further improved rise time characteristics of the gating pulses here obtained.

Further of advantage by the present invention there is eliminated the need of the more costly bi-directional trigger, since simple PNPN type uni-directional devices may be used.

Though the invention is here described as applied to parallel capacitor inverter circuitry in a single phase wound motor, it is not so restricted in its utility.

It is the general object of the present invention to provide motor circuitry of the type described having improved feedback circuitry. Another object is to provide circuitry of the type described which is amenable to the use of less costly components. A still further object is the provision of such circuitry with novel inverter frequency and thereby motor speed determining means. Other objects and advantages will appear from the following description and the drawing which is a schematic diagram of circuitry embodying the invention.

The invention is shown as embodied in a brushless direct current motor energized by a direct current source on the negative and positive terminals 10, 11, wherein the mechanical and electromagnetic structure comprises an induction motor type rotor R and a field stator wound as for a single phase A.C. motor; including a main field winding 12, conveniently wound bifilar with appropriate end connection to provide two halves 12a, 12b, represented as a center-tapped or divided winding, with a starting winding 13 having its axis physically angularly displaced from the main winding and connected across the ends of the latter in series with phase shifting capacitor 14, so that upon D.C. energization alternately of the winding halves 12a 12b to develop an alternating magnetic field, the rotor is driven by induction motor action. Further there are wound on the stator for inductive coupling with 12, the main and auxiliary feedback windings 15, 16.

Electronic switching devices, SCR's 17, 18, connected with cathodes commonly to the negative D.C. input ground lead or terminal 10 and anodes with the commutating capacitor 19 thereacross respectively to the ends of winding 12, and the gating or firing circuitry hereinafter described provide an oscillator or parallel capacitor inventer circuit whereby the direct current power applied through positive input terminal 11 to the "center" of 12, and to negative input terminal 10, is alternately switched into the two winding halves 12a, 12b.

To gate the SCR's in manner suitable for inverter action there are provided a main feedback and firing circuit supplying short sharply peaked firing pulses alternately to the SCR gates, and also an auxiliary feedback circuit which supplies to the gates alternately a prolonged pulse enduring after the sharp initial firing pulse has passed to keep SCR's turned on despite the reverse biasing which may momentarily occur due to the inherent inductive loading.

Thus the main feedback winding 15 in series with inductor 21 and adjustable resistor 22 in a branch connected at opposite ends by timing capacitors 23, 24 and also by the respective diode series pairs 25 and 27, 26 and 28, to the negative lead or common ground for the SCR cathodes forms an LRC circuit wherein the capacitors are alternately charged by feedback signals of alternating polarity arising in 15; each capacitor being in effect shunted out by the associated diode pair while the other capacitor is charging. The aforementioned diodes of the pairs 25 and 27, 26 and 28 here have practically zero forward impedance.

The like PNPN solid state uni-direction trigger devices 29 and 30 also connect the series branch 15–21–22 at each end, or more meaningfully the top sides of capacitors 23 and 24, to the gates of 17 and 18 respectively; so that as each of these capacitors is in turn charged up to the trigger voltage, the respective trigger is switched on to complete a fast discharge path for the capacitor through the gate-cathode electrode pair of the associated SCR and also for the field energy of the inductive components as permitted by the diode pair shunting the other non-discharging capacitor.

The auxiliary feedback or "keep-alive" circuit is provided by the auxiliary feedback winding 16 and resistor 36 connected in series between the SCR gates and also at one end to the cathode of 25 and anode of 27 and similarly to the anode of 26 and cathode of 28 in the diode pair at the other end. The diodes 25 and 28 with cathodes on the negative or ground lead are the diodes actually involved in the function of this portion of the gating circuitry; diode 25 when a sustaining signal is being applied to the gate-cathode pair of SCR 18, and diode 28 when similarly a sustaining signal is applied to the gate of SCR 17.

To provide for more effective selection of the frequency of inverter operation, hence of the synchronous speed of the motor, an adjustable resistor 31 and a capacitor 32 in series therewith are shown in FIG. 1 connected across the ends of the series branch of feedback winding 15, inductor 21 and resistor 22. Whereas the resistors 22, 36 are chosen or adjusted in value to optimize circuit efficiency or performance, the value change in resistor 31 is effective markedly to control and select the frequency and therefore speed or motor operation.

To simplify the drawing, there are not shown conventional or known means to ensure initial firing of only one SCR and SCR protective networks, examples of which however, are present in the aforementioned pending case.

In operation of the circuit assuming SCR 17 conducting, the auxiliary feedback circuit is providing a signal to its gate over the path of diode 28, winding 16, resistor 36 through the gate and cathode of 17 to ground; but the main feedback circuit, being so connected, is charging the capacitor 24 over the path from ground, diodes 25–27, resistor 22, inductor 21, winding 15 to capacitor 24.

When the trigger voltage of 30 is attained on the capacitor 24 and triggering occurs, it initiates discharge of 24 through the gate-cathode electrode pair of SCR 18, thereby applying a sharp fast rising gate pulse to turn on SCR 18. Inductor 21 also provides in the main feedback branch a high impedance to timing capacitor discharge ensuring that the discharge will occur through the low impedance trigger-gate-cathode path of the respective SCR. Also the magnetic field energy stored in the inductive components—winding 15 and principally inductor 21—is dissipated as trickle current supplied to the gate through diode 30 by the path completed by the diodes 25–27, keeping 30 from regaining its blocking mode. This function of inductor 21 is advantageous in preventing a damped oscillatory discharge which might otherwise occur by a trigger diode becoming blocking, the associated capacitor then again charging, followed by triggering with discharge and so on. The reverse bias applied by commutating capacitor 19 across the anode-cathode of SCR 17 turns off the latter in the usual manner. The polarity of the signal produced in 16 thereby is reversed, and with diode 25 conducting a "keep-alive" signal is now applied to the gate of 18 and charging of capacitor 23 begins for similar action in the left half of the circuit. The operation thus proceeds alternatingly repeating the firing of the SCR's in the manner described.

Though the resistive, inductive and capacitive values of the components 15, 21, 22, 23 and 24 in the principal feedback path, of course, represent parameters which would determine an operating frequency, therefore motor speed, the inclusion further of the resistance-capacitance branch 31–32 conveniently provides a motor speed adjusting means readily affording a useful range of speed change.

To adjust for production tolerance differences in the break-over voltages of the triggers 29, 30, the trigger diode connection with the principal feedback circuitry on one side of the circuit may be made by connecting its anode to the arm of a potentiometer of which the resistance ends are connected in the principal feedback path.

We claim:

1. In a brushless direct current motor including a field producing main winding divided in two halves, a pair of solid-state switching devices each comprising two electrodes connected with a respective half of the main winding in series across direct current input leads of the motor for alternately applying direct current to respective halves of the winding thereby to produce an alternating motor driving magnetic field, each said device having a third electrode serving as a control electrode in conjunction with a first of the said two electrodes thereof, the said first electrodes commonly connected to a direct current input lead, and a switching control circuit including a feedback winding electromagnetically coupled with the main winding for applying switching control signals to said devices across the first and third said electrodes thereof, the improvement comprising:

said switching control circuit including said feedback winding in a control circuit branch connected at opposite ends through uni-directional trigger diodes to respective said control electrodes and by timing capacitors to the said first electrodes, respective low forward impedance shunting diode means connecting from the common connection of the said first electrodes to respective ends of the said circuit branch, whereby from successive pulses of alternate polarity of the feedback winding the timing capacitors are alternately charged to the break-over voltage of the trigger devices to apply a control pulse rendering a respective switching device conductive.

2. The improvement of claim 1 including further an auxiliary feedback winding likewise coupled to the main winding with ends connected to respective control electrodes, each said diode means comprising a pair of diodes connected in series to conduct in the same direction and each also having a connection from the point between the pair to a respective end of the said auxiliary feedback winding, whereby the auxiliary feedback winding alternately applies a pulse sustaining a conducting condition of the respective switching device.

3. The improvement of claim 1 wherein said switching devices are silicon controlled rectifiers, with gates as said control electrodes, in a parallel capacitor inverter configuration with said main winding.

4. The improvement of claim 2 wherein said switching devices are silicon controlled rectifiers, with gates as said control electrodes, in a parallel capacitor inverter configuration with said main winding.

5. The improvement of claim 1 including as motor speed control means a capacitor and adjustable resistor connected in series between the anodes of said trigger diodes having cathodes connected to respective control electrodes.

6. The improvement of claim 2 including as speed control means a capacitor and adjustable resistor connected in series between the anodes of said trigger diodes having cathodes connected to respective control electrodes.

7. The improvement of claim 3 including as speed control means a capacitor and adjustable resistor connected in series between the anodes of said trigger diodes having cathodes connected to respective control electrodes.

8. The improvement of claim 4 including as speed control means a capacitor and adjustable resistor connected in series between the anodes of said trigger diodes having cathodes connected to respective control electrodes.

9. The improvement of claim 1 including further an inductor in said circuit branch in series with said feedback winding.

10. The improvement of claim 9 wherein said switching devices are silicon controlled rectifiers, with gates as said control electrodes, in a parallel capacitor inverter configuration with said main winding; including also an auxiliary feedback winding likewise coupled to the main winding with ends connected to respective gates; each said diode means comprising a pair of diodes connected in series to conduct in the same direction, and each also having a connection from the point between the pair to a respective end of the said auxiliary feedback winding whereby the auxiliary feedback winding alternately applies a pulse sustaining a conducting condition of the respective switching device; and further including as motor speed adjusting means a capacitor and adjustable resistor connected in series between the anodes of said trigger diodes having cathodes connected to respective gates.

References Cited

UNITED STATES PATENTS

| | | | |
|---|---|---|---|
| 3,098,958 | 7/1963 | Katz | 318—138 |
| 3,364,408 | 1/1968 | Katz et al. | 318—227 XR |
| 3,365,636 | 1/1968 | Baker | 318—138 |
| 3,416,055 | 12/1968 | Toth | 318—138 |

ORIS L. RADER, Primary Examiner

GENE RUBINSON, Assistant Examiner

U.S. Cl. X.R.

318—227, 254